United States Patent
Tomita et al.

Patent Number: 5,429,304
Date of Patent: Jul. 4, 1995

[54] ON/OFF VALVE CAPABLE OF DRAWING BACK FLUID WHEN CLOSED

[75] Inventors: Ichio Tomita, Toyota; Masashi Murate, Nagoya; Isamu Yamasaki, Toyota, all of Japan

[73] Assignee: Toyota Jidosha Kabushiki Kaisha, Toyota, Japan

[21] Appl. No.: 120,448

[22] Filed: Sep. 14, 1993

[30] Foreign Application Priority Data

Oct. 16, 1992 [JP] Japan .................... 4-278752

[51] Int. Cl.6 .................... B05B 15/02; B05B 3/10
[52] U.S. Cl. .................... 239/119; 239/223; 239/296; 251/63.6
[58] Field of Search ............. 239/106, 112, 119, 223, 239/296, 290, DIG. 14; 251/63.6; 138/45, 46

[56] References Cited

U.S. PATENT DOCUMENTS

| | | | |
|---|---|---|---|
| 1,941,453 | 1/1934 | Whittington | 138/46 X |
| 2,057,925 | 10/1936 | Smith et al. | 138/46 |
| 2,686,562 | 8/1954 | MacCracken et al. | 239/119 |
| 3,106,226 | 10/1963 | Machen | 138/45 |
| 3,135,994 | 6/1964 | Skinner | 138/46 |
| 3,188,048 | 6/1965 | Sutherland | 251/63.6 |
| 4,145,025 | 3/1979 | Bergeron | 251/63.6 X |
| 4,489,756 | 12/1984 | Balz | 251/63.6 X |
| 4,597,719 | 7/1986 | Tano | 251/63.6 X |
| 5,027,919 | 7/1991 | Silva et al. | 138/45 X |
| 5,092,362 | 3/1992 | Yie | 239/526 X |
| 5,100,057 | 3/1992 | Wacker et al. | 239/223 |
| 5,156,336 | 10/1992 | Hammond et al. | 239/222.11 X |

FOREIGN PATENT DOCUMENTS

| | | | |
|---|---|---|---|
| 823859 | 1/1938 | France | 251/63.6 |
| 74260 | 11/1960 | France | 138/45 |
| 1343747 | 10/1963 | France | 251/63.6 |
| 940679 | 10/1963 | United Kingdom | 251/63.6 |
| 2105837 | 3/1983 | United Kingdom | 239/106 |

*Primary Examiner*—Andres Kashnikow
*Assistant Examiner*—Lesley D. Morris
*Attorney, Agent, or Firm*—Cushman, Darby & Cushman

[57] ABSTRACT

An OFF/OFF valve including a fluid passage formed in the valve body, and having a valve seat, a smaller diameter portion extending from the valve seat on a downstream side of the valve seat, and a larger diameter portion extending from the smaller diameter portion on a downstream side of the smaller diameter portion. A valve element is disposed so as to be movable between a position adjacent the valve seat and a position within the larger diameter portion. The valve element is driven by a valve element driving assembly. When the valve is closed, the valve element moves toward the valve seat. When the valve element moves within the smaller diameter portion, the fluid which has passed through the valve element is drawn back due to the pumping effect of the valve element before the valve element finally reaches the valve seat and the valve is completely closed.

6 Claims, 3 Drawing Sheets

ON/OFF VALVE CAPABLE OF DRAWING BACK FLUID WHEN CLOSED

BACKGROUND OF THE INVENTION

1. Field of the Invention

The present invention relates to an ON/OFF valve and, more particularly to an ON/OFF valve capable of drawing back fluid which has passed through the valve, when the valve is closed. Such a valve can be used for a paint valve of a coating apparatus to prevent paint from dripping from a paint nozzle after paint injection through the paint nozzle has stopped.

2. Description of the Related Art

To develop a multi-color coating apparatus provided with a plurality of paint nozzles corresponding to respective paint colors, dripping paint from a paint nozzle must be prevented to prevent paint colors from mixing when paint injection through the paint nozzle has stopped and paint injection through another paint nozzle is started, to change the paint color. If a conventional ON/OFF valve is applied to such a multi-coating apparatus with a plurality of paint nozzles, paint dripping from a paint nozzle after valve closure cannot be completely prevented, because paint fills the entire paint passage from the valve to the tip of the paint nozzle and paint located in the vicinity of the tip of the paint nozzle easily drips from the paint nozzle due to gravity.

SUMMARY OF THE INVENTION

An object of the invention is to provide an ON/OFF valve which draws back fluid which has passed through the valve, when the valve is closed. If the valve is applied to a multi-color coating apparatus provided with a plurality of paint nozzles, the valve can almost completely prevent paint from dripping from the paint nozzle when paint color is changed.

BRIEF DESCRIPTION OF THE DRAWINGS

The above and other objects, features, and advantages of the present invention will become apparent and will be more readily appreciated from the following detailed description of the preferred embodiments of the invention taken in conjunction with the accompanying drawings, in which.

DETAILED DESCRIPTION OF THE PREFERRED EMBODIMENTS

Figure 1:
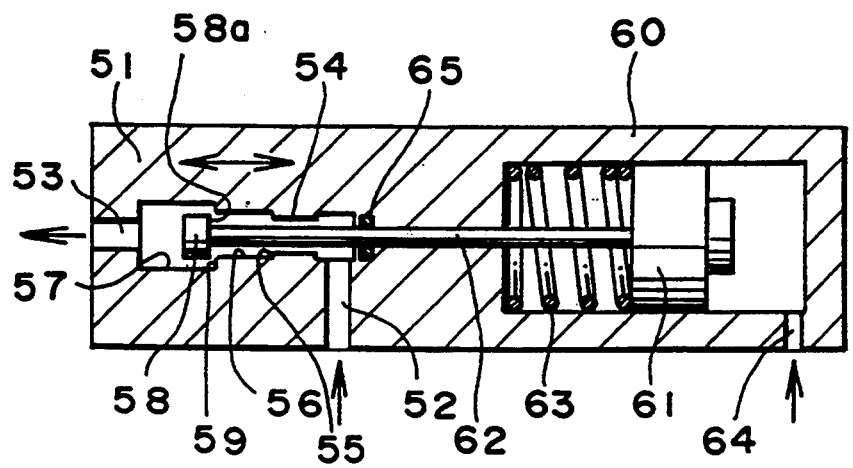
FIG. 1 is a cross-sectional view of an ON/OFF valve in accordance with a first embodiment of the present invention.

As illustrated in FIG. 1, an ON/OFF valve in accordance with a first embodiment of the invention generally includes a valve body 51, a valve element 58, and a valve element driving means for moving the valve element 58.

The valve body 51 or valve casing has a fluid passage formed therein. The fluid passage includes an inlet 52, an outlet 53, and an intermediate portion 54 connecting the inlet 52 and the outlet 53. The intermediate portion 54 of the fluid passage includes a valve seat 55 having an inside diameter and an outside diameter, a smaller diameter portion 56 extending from the valve seat 55 on a downstream side of the valve seat 55 and having a diameter equal to or larger than the outside diameter of the valve seat 55, and a larger diameter portion 57 extending from the smaller diameter portion 56 on a downstream side of the smaller diameter portion 56 and having a diameter greater than the diameter of the smaller diameter portion 56.

The valve element 58 is disposed in the fluid passage formed in the valve body 51 so as to be movable between a position adjacent the valve seat 55 and a position within the larger diameter portion 57 in directions toward and away from the valve seat 55. The valve element 58 has a diameter greater than the inside diameter of the valve seat 55 and slightly smaller than the diameter of the smaller diameter portion 56 of the intermediate portion 54 of the fluid passage.

The valve element driving means is adapted to move the valve element 58 between the position adjacent the valve seat 55 and the position within the larger diameter portion 57. In the first embodiment of the invention, the valve element driving means comprises a piston-cylinder mechanism. More particularly, the valve element driving means comprises a cylinder 60 coupled to the valve body 51 (or integrally formed with the valve body 51), a piston 61 slidably disposed within the cylinder 60, a piston-rod 62 connecting the piston 61 and valve element 58, a spring 63 disposed within the cylinder 60 between an inner end surface of the cylinder 60 and the piston 61 and biasing the valve element 58 via the piston 61 in a direction toward the valve seat 55, and a pilot-air introducing port 64 formed in a portion of the cylinder 60 that is on an opposite side of the piston 61 with respect to the spring 63. A seal member 65 is provided to prevent fluid from leaking through the very small clearance between the piston-rod 62 and the valve body 51.

The diameter of the smaller diameter portion 56 is preferrably about 0.01–1 mm greater than the diameter of the valve element 58. The reason for the lower limit, 0.01 mm is that if the clearance between the smaller diameter portion 56 and the valve element 58 is less than 0.01 mm, slidability of the valve element relative to the smaller diameter portion 56 will be impaired. The reason for the upper limit, 1 mm is that if the clearance between the smaller diameter portion 56 and the valve element 58 is greater than 1 mm, paint cannot be smoothly drawn back when the valve is closed.

It is preferable for the diameter of the larger diameter portion 57 to be at least 1 mm greater than the diameter of the smaller diameter portion 56 so that fluid can flow through the clearance between the valve element 58 and the larger diameter portion 57 without encountering a large flow resistance. The smaller diameter portion 56 and the larger diameter portion 57 are interconnected to each other via a step 59 formed therebetween.

The valve seat 55, the smaller diameter portion 56 and the larger diameter portion 57 have a common axis. Both the valve seat 55 and a surface 58a of the valve element 58 opposing the valve seat 55 are perpendicular to the common axis. When the valve element 58 is moved toward the valve seat 55 and the surface 58a of the valve element 58 contacts the valve seat 55, fluid flow is stopped, i.e., the ON/OFF valve is closed. When the valve element 58 is moved away from the valve seat 55 and the surface 58a of the valve element 58 lifts from the valve seat 55, the ON/OFF valve is opened.

The valve element driving means of FIG. 1 may be replaced by another structure, for example, a diaphragm mechanism. More particularly, with reference to FIG. 5 wherein structures corresponding to those of the first embodiment are denoted with the same reference numerals, in accordance with the second embodiment of the invention, the valve element driving means comprises a diaphragm casing 60A coupled to the valve body 51, a diaphragm 61A supported within the diaphragm casing 60A, a rod 62A connecting the diaphragm 61A and the valve element 58, a spring 63A disposed within the diaphragm casing 60A between an inside surface of the diaphragm casing 60A and the diaphragm 61A and biasing the valve element 58 via the diaphragm 61A in a direction toward the valve seat 55, and a pilot-air introducing port 64A formed in a portion of the diaphragm casing 60A that is on an opposite side of the diaphragm 61A with respect to the spring 63A.

Figure 2:
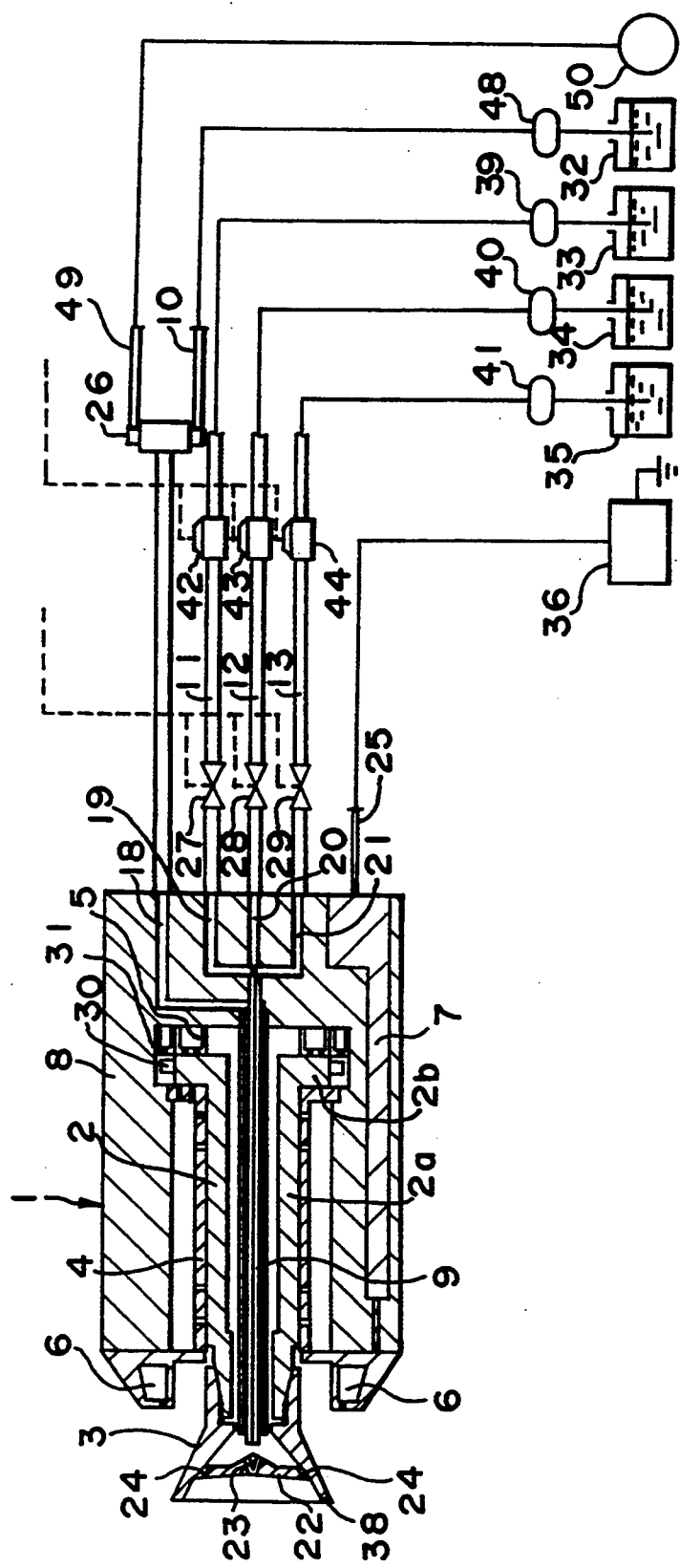
FIG. 2 is a cross-sectional view of a multi-color coating apparatus to which the valve of FIG. 1 may be applied.
Figure 3:
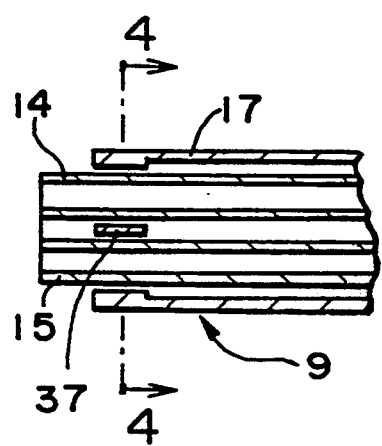
FIG. 3 is an enlarged cross-sectional view of an end of a nozzle assembly of the apparatus of FIG. 2.
Figure 4:
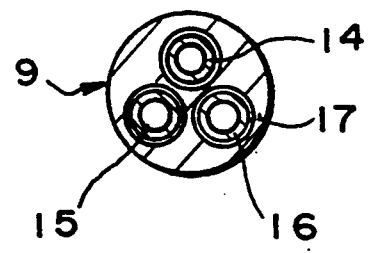
FIG. 4 is an enlarged transverse cross-sectional view of the end of the nozzle assembly of FIG. 3 taken along line 4—4.

The ON/OFF valves of the first embodiment and the second embodiment of the present invention can be used as paint valves for a multi-color, rotary atomizing electrostatic coating apparatus as shown in FIGS. 2–4. More particularly, the rotary atomizing electrostatic coating apparatus 1 of the invention has a body 8, a hollow shaft 2, a radial bearing 4, a thrust bearing 5, an atomizing head 3, an air motor 30, 31, a nozzle assembly 9, an electrostatic high voltage generating device 7, and a paint spray shaping air injection device 6.

The body 8 is a static member and is constructed of an electrically non-conductive material, for example, synthetic resin. The body 8 is generally cylindrical and has an axially extending cylindrical recess. The hollow shaft 2 is housed in the cylindrical recess of the body 8 and is rotatably supported by and lies coaxially with the body 8 via a radial bearing 4 and a thrust bearing 5 which are air bearings. The hollow shaft 2 has a cylindrical portion 2a and a flange portion 2b towards the rear end of the cylindrical portion. The hollow shaft 2 is supported by the radial bearing 4 at the cylindrical portion 2a and by the thrust bearing 5 at the flange portion 2b. The hollow shaft 2 is rotatably driven by an air motor which comprises a plurality of turbine blades 30 fixed to an outside surface of the flange portion 2b of the hollow shaft 2 and air injection nozzles 31 for injecting air against the turbine blades 30 so that the hollow shaft 2 is rotated about an axis of the apparatus. The atomizing head 3 is coupled to the hollow shaft 2 so as to rotate together with the hollow shaft 2. The atomizing head 3 and the hollow shaft 2 are coaxial with each other. The atomizing head 3 and the hollow shaft 2 are constructed of an electrically conducting material, for example, stainless steel. The atomizing head 3 and the hollow shaft 2 are screw-engaged to each other and are fitted to each other at tapered end-portions of the atomizing head 3. The atomizing head 3 has a bell 38 and a hub 22 transverse to an axis of the atomizing head. The atomizing head 3 has a center bore at the bell 38 and the hollow shaft 2 has an axially extending center bore.

The nozzle assembly 9 is fixed to the body 8 and/or the thrust bearing 5 and is static. The nozzle assembly 9 is disposed coaxially with the hollow shaft 2 and extends through the bore of the hollow shaft 2 and the bore of the atomizing head 3 so that one end of the nozzle assembly 9 is opposed to the hub 22 of the atomizing head 3. The nozzle assembly 9 selectively supplies a paint and a washing solvent (i.e., thinner) into the atomizing head 3. The nozzle assembly 9 includes a plurality of paint supply nozzles (hereinafter, paint nozzles) 14, 15, 16 for supplying paints of different colors arranged in parallel with each other, and a washing solvent supply nozzle (hereinafter, a solvent nozzle) 17 for supplying solvent or thinner for washing the atomizing head 3 and the outside surfaces of the ends of the paint nozzles 14, 15 and 16. The paint nozzles 14, 15 and 16 and the solvent nozzle 17 are constructed of metal, for example, stainless steel. The paint nozzles 14, 15 and 16 are separate from each other and are independent of each other as respective paint paths. The paint nozzles 14, 15 and 16 communicate with paint sources 33, 34 and 35, respectively, of different paint colors, which are also separate from each other.

Between two and ten paint nozzles may ideally be provided. FIG. 4 illustrates an apparatus which has three paint nozzles arranged on a common circle. The diameters of the paint nozzles may be equal to each other as shown in FIG. 4, or may differ in accordance with the viscosities (usually, 30–300 centi-poise) of the paints which pass through the respective paint nozzles.

As shown in FIGS. 3 and 4, the solvent nozzle 17 has an end plate 37 at a downstream end thereof. The end plate 37 has the same number of apertures as the number of the paint nozzles. Each paint nozzle 14, 15, 16 extends through a respective aperture formed in the end plate 37 with a clearance held between the aperture and the outside surface of the paint nozzle. The clearance allows solvent or thinner to flow therethrough when the paint color is changed. A positioning plate (not shown) is provided within the solvent nozzle 17 adjacent to the end plate 37 to prevent the paint nozzles from vibrating and has a plurality of apertures to allow the solvent to flow therethrough.

The paint nozzles 14, 15 and 16 have downstream ends which protrude outside from a downstream end of the solvent nozzle 17 by about 0.5 mm–10 mm. If the paint nozzles are recessed with the end of the solvent nozzle or if the protrusion amount of the paint nozzles from the solvent nozzle is smaller than about 0.5 mm, the flow of the solvent through the clearance between the paint nozzle and the solvent nozzle might be disturbed. If the protrusion of the paint nozzles from the solvent nozzle is greater than 10 mm, the paint nozzles might be too close to the hub 22 of the atomizing head 3 or might interfere with the hub 22.

As illustrated in FIG. 2, the hub 22 of the atomizing head 3 is positioned ahead of the nozzle assembly 9. The hub 22 has a central portion protruding toward the nozzle assembly 9. The central portion is cone-shaped so that the paint supplied against the cone-shaped portion smoothly changes flow direction to a radially outward direction. The hub 22 has a plurality of first apertures 24 as a radially outermost portion of the hub, which are provided at equi-intervals and which extend in a direction along the inside surface of the bell 38. The first apertures 24 have a diameter which allow a paint to pass smoothly therethrough. The hub 22 has a plurality of second apertures 23 at the central, cone-shaped portion thereof. Each second aperture 23 is inclined with respect to the axis of the atomizing head 3 so that the paint injected from a given paint nozzle parallel to the axis of the atomizing head 3 does not pass straight through the second aperture in the form of a thread. Each second aperture 23 has a smaller diameter than that of a first aperture 24 so that primarily the solvent, which has a lower viscosity than paint, can pass through the second aperture 23 when solvent is supplied to the atomizing head 3.

The electrostatic high voltage generating device 7 is housed in the paint gun body 8. The generating device 7 is electrically connected via element 25 to a low voltage electric power source 36 and generates electricity of a high voltage (for example, about 60–90 KV) at a high frequency (for example, about 3 KHz). The electricity is conducted through the metal members, for example, the paint spray shaping air injection device 6, the bearings 4 and/or 5, and the hollow shaft 2, to the atomizing head 3. The paint flowing along the surface of the atomizing head 3 is electrified with negative ions and is dispersed into fine drops at the end of atomizing head 3 due to the centrifugal force acting on the paint. The fine paint drops are further atomized due to electrical repulsion. The atomized drops are electrically attracted toward an workpiece to be painted (for example, an automobile body) which is positively electrified during painting.

The paint spray shaping air injection device 6 has a nozzle for injecting air for controlling the spray pattern of scattering paint drops. The injected air also promotes atomization of the paint drops.

As illustrated in FIG. 2, the coating apparatus further includes a plurality of paint valves 27, 28 and 29, and a solvent valve 26; a plurality of paint sources 33, 34 and 35, and a solvent source 32; a plurality of paint passages 19, 20 and 21, and a solvent passage 18; and a plurality of paint hoses 11, 12 and 13, and a solvent hose 10. The paint sources 33, 34 and 35 have respective paint colors which are different from one another. The number of paint valves 27, 28 and 29 is the same as the number of the paint nozzles. Each paint passage 19, 20, 21 connects a respective paint nozzle 14, 15, 16 to a respective paint valve 27, 28, 29. The solvent passage 18 connects the solvent nozzle 17 to the solvent valve 26. Similarly, each paint hose 11, 12, 13 connects a respective paint valve 27, 28, 29 to a respective paint source 33, 34, 35. The solvent hose 10 connects the solvent valve 26 to the solvent source 32 via a solvent pump 48. The solvent valve 26 may also have a port which is connected to a washing air source 50 via an air hose 49. By feeding not only a solvent, but also air, the paint washing effect is increased and the washing period is decreased.

Figure 5:
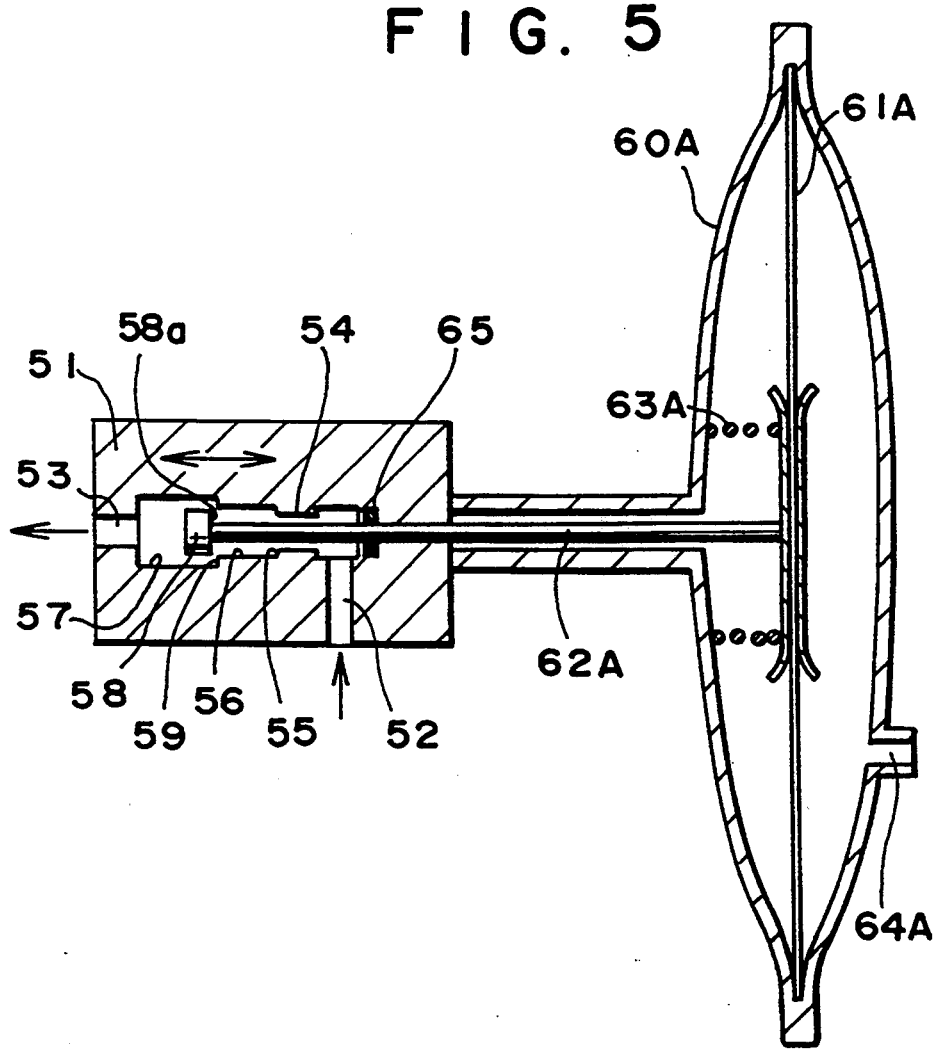
FIG. 5 is a cross-sectional view of an ON/OFF valve in accordance with a second embodiment of the present invention.

The air-actuated ON/OFF valve shown in FIG. 1 or FIG. 5 is used as paint valves 27, 28 and 29. The ON/OFF valve of FIG. 1 may also be used as the solvent valve 26. The solvent valve 26 may also comprise an air-actuated ON/OFF valve which has two ON/OFF portions, one for solvent and another for air, with the one for solvent having the same structure as that of the valve of FIG. 1 or FIG. 5.

In each paint hose 11, 12, 13, a gear pump 39, 40, 41 and/or an air-actuated flow regulator 42, 43, 44 is installed. There may be a return hose (not shown) for returning excess paint from the regulator to the paint source.

The paint paths from the paint sources 33, 34 and 35 to the downstream ends of the paint nozzles 14, 15 and 16 are separate from each other, so they do not communicate with each. The solvent path from the solvent source 32 to the downstream end of the solvent nozzle 17 is separate from the paint paths, so it does not communicate with the paint paths.

Operation of the ON/OFF valve and the coating apparatus provided with the ON/OFF valve will now be explained.

While pilot air is being introduced into the chamber on one side of the piston 61 (or the diaphragm 61A), the piston 61 (or the diaphragm 61A) is offset so that the valve element 58 is within the larger diameter portion 57 to maintain the valve open.

When supply of the pilot air is cut, the piston 61 (or the diaphragm 61A) is moved by the spring 63 (or 63A) so that the valve element 58 moves from the larger diameter portion 57 toward the valve seat 55. When the valve element 58 gets into the smaller diameter portion 56, flow of fluid is substantially stopped because the resistance to flow through the clearance between the smaller diameter portion 56 and the valve element 58 is large. When the valve element 58 further moves within the smaller diameter portion 56 toward the valve seat 55, the fluid which has passed through the valve element 58 and is disposed in the larger diameter portion 57 is drawn back toward the moving valve element 58 by the pumping operation of the valve element 58. When the nozzle communicates with the outlet 53 of the ON/OFF valve, the fluid which has filled the entire passage from the valve to the tip of the nozzle is also drawn back. As a result, the downstream end of the fluid is recessed from the tip of the nozzle, and dripping of the fluid from the tip of the nozzle is unlikely to occur. When the valve element 58 finally reaches the valve seat 55 and the surface 58a of the valve element 58 contacts the valve seat 55, the ON/OFF valve is completely closed and no fluid can pass through the ON/OFF valve. It is to be noted that closure of the ON/OFF valve and the drawing back of the fluid are conducted in one stroke of the valve element 58 and that the drawing back of the fluid is effected prior to shutting the ON/OFF valve.

When the ON/OFF valve of the invention is provided in a multi-color coating apparatus and a paint color is changed, one paint valve (for example, valve 27) is closed and another paint valve (for example, valve 28) is opened. In this instance, the paint in the paint nozzle corresponding to the closed valve 27 is drawn back from the tip of the paint nozzle so that paint dripping is prevented. As a result, paint mixture at the time of paint color change is prevented in the multi-color coating apparatus.

In accordance with the ON/OFF valve of the present invention, since the smaller diameter portion 56 which has a diameter slightly larger than the diameter of the valve element 58 is provided between the larger diameter portion 57 and the valve seat 55, when the valve element 58 moves toward the valve seat 55, the fluid which has passed through the valve element 58 is drawn back before the valve element 58 reaches the valve seat 55. The drawing back of the fluid is automatically conducted in the same stroke as the closing stroke of the valve element 58, so the operation is simple and certain. Further, if the ON/OFF valve of the invention is used for the paint valve of the multi-color coating apparatus, the paint is drawn back from the tip of the paint nozzle so that mixture of paint colors when the paint color is changed is completely prevented.

Although only a few embodiments of the invention have been described in detail above, it will be appreciated by those skilled in the art that various modifications and alterations can be made to the particular embodiments described here without materially departing from the novel teachings and advantages of the present invention. Accordingly, it is to be understood that all such modifications and alterations are included within the spirit and scope of the present invention as defined by the following claims.

What is claimed is:

1. An ON/OFF valve capable of drawing back fluid when being closed, comprising:
    a valve body having a fluid passage formed therein, the fluid passage including an inlet, an outlet, and an intermediate portion connecting the inlet and the outlet, the intermediate portion of the fluid passage including 1) a valve seat having an inside diameter and an outside diameter, 2) a smaller diameter portion extending from the valve seat on a downstream side thereof and having a diameter equal to or larger than the outside diameter of the valve seat, and 3) a larger diameter portion extending from the smaller diameter portion of the intermediate portion of the fluid passage on a downstream side thereof and having a diameter greater than the diameter of the smaller diameter portion of the intermediate portion of the fluid passage;
    a valve element disposed in the fluid passage and movable between a position adjacent the valve seat and a position away from the valve seat within the larger diameter portion of the intermediate portion of the fluid passage, the valve element having a diameter greater than the inside diameter of the valve seat and slightly smaller than the diameter of the smaller diameter portion of the intermediate portion of the fluid passage, the diameter of the valve element being about 0.01-1 mm smaller than the diameter of the smaller diameter portion of the intermediate portion of the fluid passage; and
    a valve element driving means for moving the valve element between said position adjacent the valve seat and said position away from the valve seat within the larger diameter portion of the intermediate portion of the fluid passage.

2. A valve according to claim 1, wherein the valve element driving means comprises:
    a cylinder coupled to the valve body;
    a piston slidably disposed within the cylinder;
    a piston-rod connecting the piston and valve element;
    a spring disposed between the cylinder and the piston and biasing the valve element via the piston in a direction toward the valve seat; and
    a pilot-air introducing port formed in a portion of the cylinder that is on an opposite side of the piston with respect to the spring.

3. A valve according to claim 1, wherein the valve element driving means comprises:
    a diaphragm casing coupled to the valve body;
    a diaphragm supported within the diaphragm casing;
    a rod connecting the diaphragm and the valve element;
    a spring disposed between the diaphragm casing and the diaphragm and biasing the valve element via the diaphragm in a direction toward the valve seat; and
    a pilot-air introducing port formed in a portion of the diaphragm casing that is on an opposite side of the diaphragm with respect to the spring.

4. A valve according to claim 1, wherein the smaller diameter portion of the intermediate portion of the fluid passage and the larger diameter portion of the intermediate portion of the fluid passage are interconnected via a step formed therebetween.

5. A valve according to claim 1, wherein the valve seat, the smaller diameter portion of the intermediate portion of the fluid passage and the larger diameter portion of the intermediate portion of the fluid passage have a common axis, and wherein both of the valve seat and a surface of the valve element opposing the valve seat are perpendicular to the common axis.

6. A multi-color coating apparatus comprising:
    a static paint gun body;
    a hollow shaft rotatably disposed within said paint gun body;
    an atomizing head coupled to the hollow shaft so as to rotate together with said hollow shaft;
    driving means for rotatably driving the hollow shaft;
    a static nozzle assembly extending through the hollow shaft opposite said atomizing head, including a plurality of paint nozzles and a solvent nozzle, each said paint nozzle supplying a particular paint to said atomizing head; and
    a plurality of paint valves, each paint valve corresponding to a respective one of said paint nozzles, each paint valve comprising:
        (a) a valve body having a paint passage formed therein, the paint passage including an inlet, an outlet, an intermediate portion connecting the inlet and the outlet, the intermediate portion of the paint passage including 1) a valve seat having an inside diameter and an outside diameter, 2) a smaller diameter portion extending from the valve seat on a downstream side thereof and having a diameter equal to or larger than the outside diameter of the valve seat, and 3) a larger diameter portion extending from the smaller diameter portion of the intermediate portion of the paint passage on a downstream side thereof and having a diameter greater than the diameter of the smaller diameter portion of the intermediate portion of the paint passage;
        (b) a valve element disposed in the paint passage and movable between a position adjacent the valve seat and a position away from the valve seat within the larger diameter portion of the intermediate portion of the paint passage, the valve element having a diameter greater than the inside diameter of the valve seat and slightly smaller than the diameter of the smaller diameter portion of the intermediate portion of the paint passage, the diameter of the valve element being about 0.01-1 mm smaller than the diameter of the smaller diameter portion of the intermediate portion of the fluid passage; and
        (c) a valve element driving means for moving the valve element between the position adjacent the valve seat and said position away from the valve seat within the larger diameter portion of the intermediate portion of the paint passage.

* * * * *